3,294,582
PROCESS OF MAKING IMPREGNATED PAPER FILTER ELEMENTS AND COMPOSITION THEREFOR
George E. Suchy, Flint, Mich., assignor to General Motors Corporation, Detroit, Mich., a corporation of Delaware
No Drawing. Filed Jan. 8, 1963, Ser. No. 250,003
3 Claims. (Cl. 117—155)

This invention relates to paper filter elements and more particularly to synthetic resin impregnated filter paper useful in the manufacture of oil filters and the like.

It is customary practice to impregnate filter paper which is to be used in the manufacture of oil filters and the like with a thermosetting resin such as a phenol-formaldehyde resin to provide the paper with suitable structural resistance toward collapse and tearing in its use for filtering purposes. In a conventional resin impregnating process the filter paper is first impregnated with a liquid phenolic varnish. The impregnated paper is then passed into a drying oven maintained at about 190° F. wherein most of the solvent which serves as a carrier for the phenolic varnish is evaporated to permit efficient handling of the paper. This partially dryed paper is then folded suitably, preferably in the form of bellows or the like. The folded paper is then cut to suitable lengths and assembled with other supporting parts and adhesives into annular or can-type filter elements. The final operation involves subjecting the completed assembly to oven heat in order to cure the impregnated phenolic resin and the adhesives to bond the various filter element parts together.

A shortcoming of the conventional phenol-formaldehyde impregnated paper described above is that the phenolic resin cures to a relatively brittle state which limits the toughness of the paper and its capacity to withstand handling. It is the basic object of this invention to provide a thermosetting synthetic resin impregnated filter paper which has a markedly improved flexibility and a markedly superior resistance to collapse and tearing and a greater ability to withstand rough handling during the course of filter manufacture and in subsequent use. It is a further object of this invention to provide a process for making the aforementioned improved filter paper. In their broader aspects these objects are accomplished by the use of a Stage A phenol-formaldehyde resin having included therein small quantities of resorcinol as the impregnating resin. In the preferred form of the invention the resin impregnant consists of a phenol-formaldehyde resin of the resole type combined with substantial amounts of a thermoplastic resinous material derived from pine wood containing both methoxyl and hydroxyl groups and small proportions of resorcinol. The resole form of the phenolic resin and the resorcinol each imparts a greater flexibility to the filter paper beyond that which would be expected with the conventional novolak type of phenolic resin impregnant. Other objects and advantages of the invention will be apparent from the following detailed description.

As briefly indicated above, this invention is concerned with the manufacture of paper filter material for use in the fabrication of filter elements useful primarily in oil filter applications and the like which includes a paper filter medium preferably in the form of a cylinder having walls thereof folded in a bellows-like configuration to achieve maximum filtering surface and physical strength. Desirably, the ends of the cylindrical filter element are bonded or fastened to rigid end plates by means of a suitable adhesive type synthetic resin. This invention is concerned principally with the manufacture of the paper portion of the filter element and more particularly with the resin material used for impregnating the paper and its cure which has been found to provide the paper with markedly greater flexibility after cure and consequent greater resistance to collapse and tear.

In the past, the paper element was manufactured in a process which involved first coating the paper with a heat-curable liquid phenolic varnish by means of roller apparatus such as is disclosed in the U.S. Patent No. 2,700,620 Somers assigned to the assignee of this invention. In the prior art process the phenol-formaldehyde varnish consists essentially of a heat-curable or stage A type phenol-formaldehyde resin dissolved in a suitable carrier solvent such as an aqueous mixture of isopropanol or ethanol. Following the impregnation step the resin-coated paper is passed through a drying oven to evaporate a major proportion of the resin carrier. Thereafter the paper is folded to a suitable configuration and assembled into an annular filter element and finally the thusly assembled element is subjected to oven heat at a temperature and time sufficient to cure the phenolic resin to a sufficient degree consistent with optimum strength and flexibility. In its broader aspects the process of this invention involves including small porportions of resorcinol on the order of about 1% to 5% by weight to the resole form of phenol-formaldehyde varnish. It has been found that the resorcinol-containing varnish, when applied to filter paper and subsequently cured, produces a filter paper of superior flexibility and a filter paper having superior resistance to collapse and tear. In a preferred embodiment of the invention a resin impregnant is used which provides the filter paper with equally satisfactory strength and flexibility characteristics but which may be processed through the drying step at temperatures of about 50° F. less than is necessary with the aforementioned phenol-formaldehyde type resins. Specifically, the filter paper impregnating mixture consists of water, a resole varnish, a thermosetting lignin-type resinous material derived from pine wood containing both methoxyl and hydroxyl groups and small quantities of resorcinol.

The lignin-type resin referred to is known commercially as Vinsol. Briefly, this material may be obtained from a variety of pine-type woods by physical and/or chemical treatment. The Vinsol is a thermoplastic lignin-type resinous material derived from pine wood containing both methoxyl and hydroxyl groups which is substantially insoluble in petroleum solvents such as gasoline. The Vinsol resinous material is obtained by extracting a resinous wood with a coal tar hydrocarbon such as gasoline and removing the hydrocarbon by evaporation leaving a residue comprising a mixture of wood rosin and the thermoplastic resinous material. The rosin is then extracted with a petroleum hydrocarbon leaving the aforementioned thermoplastic resinous material.

The preferred process of this invention involves first impregnating the paper with a resinous varnish which consists essentially of a mixture of a heat-curable resole-type phenol-formaldehyde resin, water, the aforesaid Vinsol and resorcinol. The Vinsol is preferably present in amounts of about 25 parts by weight to 100 parts by weight of the phenol-formaldehyde resin solids and the resorcinol is present in amounts of about 3 parts by weight. Preferably about 0.7 part by weight of caustic soda is added to bring the pH of the solution to about 7.6 to 8 which otherwise tends to be depressed by the Vinsol. Maintaining the pH at this level insures a rapid cure. It has been determined that amounts of the Vinsol beyond about 25 parts by weight per 100 parts by weight of the phenol-formaldehyde solids serves no useful function and likewise the use of resorcinol in excess of about 6.5 parts by weight serves no useful function. Beyond about 28 parts by weight of the Vinsol, losses have been observed in the physical properties of the cured paper. Thus, for example, at the level of 32 parts by weight of the Vinsol, the filter paper tensile strength is reduced to a significant degree and at 36 parts by weight of the Vinsol a marked inferiority in the tensile strength is observed. The use of the Vinsol component beyond 28 parts is also undesirable because it causes the final curing reactions to be undesirably slow.

In the broad aspects of the invention the heat-curable phenol-formaldehyde resin may be either in the form of resole or a novolak since the resorcinol provides the resulting paper with an improved flexibility. However, the use of a resole is preferred since the novolak produces a more brittle product. The resorcinol has been found to produce a similar flexibilizing effect on the resole resin with the result that a product of superior flexibility is obtained when using the resole form of the phenolic resin. The term "resole" as used herein is intended to refer to essentially a cross-linked resin formation of phenolic alcohols formed as the first reaction products of an alkali catalzed reaction of phenols and aldehydes plus some methylene ethers or methylol derivatives. The resole is soluble in organic solvents such as acetone, ethanol and isopropanol. The resole does not require a catalyst for further reaction. In the case of a novolak, the addition of a formaldehyde supplying material such as hexamethylenetetramine is used in the mixture for promoting further reaction and cross-linking of the novolak.

It is preferred that the paper impregnant contain at least 20 parts by weight of the Vinsol in order to take advantage of the low oven temperatures which may be used to evaporate the solvent from the paper. The amount of Vinsol per 100 parts of the resole solids may be reduced below 20 parts by weight if the water content of the mixture is increased. However, an increase in the water content is accompanied by an increasing brittleness of the cured paper which is to be avoided. It is believed that the Vinsol component counteracts the normal tendency of the paper to become brittle due to an increased water content and in order to secure the benefits of low drying temperatures a quantity of water should be a substantial fraction of the maximum water which can be tolerated by the mixture without its becoming heterogeneous. The resorcinol enters into the final curing reaction and is believed to serve the capacity of a flexibilizer. Although optimum results are obtained using about 3 parts by weight of resorcinol per 100 parts by weight of the resole and 25 parts by weight of the Vinsol, 1 part by weight of resorcinol per 100 parts by weight of resole with a variation of the Vinsol from 20 to 28 parts by weight produces significantly improved results. As previously indicated, quantities of resorcinol beyond about 6 parts by weight do not produce noticeable improvement.

The maximum amount of water which may be present in the impregnant is the maximum quantity which can be added to the mixture of the Vinsol and the resole varnish without the composition becoming heterogeneous. The step of increasing the quantity of Vinsol present causes a decrease in the water tolerance. At the preferred level of 25 parts by weight of the Vinsol and 3 parts by weight of resorcinol per 100 parts by weight of the resole varnish solids, the water tolerance at room temperatures of about 77° F. is about 25 parts by weight of water per 100 parts by weight of the Vinsol-resole solids mixture when this mixture is prepared by mixing a 60% Vinsol solution in isopropanol with the (ethanolic) resole varnish of about 63% to 68% solids composition. When the same resole varnish free of the Vinsol is mixed with water, approximately 50 parts by weight of water can be tolerated at 77° F. before the composition becomes heterogeneous. It is preferred to use about 18.5 parts by weight of water per 100 parts by weight of Vinsol-resole varnish solids or about 75% of the maximum amount which can be tolerated and still maintain homogeneity. An increase in the water content beyond the 18.5 parts tends to present difficulties in localized areas of the filter paper due to a preferential evaporation of alcohol resulting in localized areas of nonuniformity in the properties of the filter paper. In order to maintain the quick drying benefits at a maximum, it is preferred to maintain the water content near to the practical maximum water content of about 18.5 parts of water per 100 parts by weight of the Vinsol-resole varnish solids. A progressive reduction of the water content below the 18.5 parts figure causes a progressive reduction in the extent of quick drying benefits until it ceases to exist. It is, therefore, preferred to maintain the water content at not significantly outside the range of about 17 to 20 parts by weight to 100 parts by weight of the Vinsol-resole solids.

In the process of making the filter elements, the impregnant is applied to the paper by means of machinery including rollers such as are disclosed in the United States Patent No. 2,700,620, Somers, assigned to the assignee of this invention. The rolls of this apparatus have a calendering effect on the paper such that after passing between the rolls, the paper has a somewhat increased resistance to the passage of fluids. It has been found that in the use of the impregnant of this invention including water, the Vinsol, the resorcinol and the resole varnish, the amount of this increase due to calendering is about 20% of the increase obtained under like circumstances but using a straight alcoholic resole varnish free of Vinsol and added water. This is believed due to a softening or plasticizing effect of the water on the paper fibers and is an important advantage in the production of improved filter elements.

It is also to be appreciated that the maximum water content of the impregnant is also limited because of the adverse effect of excessive amounts of water on the wet strength character of the paper. Increasing the water content significantly above the 18.5 parts by weight as, for example, in excess of about 20 parts by weight, would tend to cause a substantial reduction in the wet strength of the paper as a consequence of which considerable paper breakage could be expected to occur between the paper impregnation apparatus and the initial drying oven with the production of much scrap and production loss.

A basic requirement of an impregnant resin for use in the manufacture of paper filter elements is that an adequate amount of strength-giving resin solids be capable of completely penetrating the paper sheet with a minimum calendering effect (loss of permeability). The more dilute the impregnant, the greater the volume of impregnant required to obtain a desired resin solids content on the paper sheet as it passes through the impregnant composition. As this volume is increased, the probability of complete penetration of the paper is likewise increased. Increased pressure of the application rolls on the sheet will increase the probability of complete penetration. The more viscous the liquid impregnant, the less is the tendency for it to soak through the sheet and therefore the lower the chances for a complete penetration of the sheet.

Of these factors the amount of pressure which may be applied to the sheet cannot be varied greatly since the pressure on the sheet must be sufficient to enable the rolls to draw the paper off a supply reel. The volume of impregnant which must be supplied to the paper to obtain the appropriate amount of resin solids does not ordinarily vary significantly unless there is a change in the character of the solvent. Thus, at the 63% resin solids level, the viscosity is in the range of 200 c.p.s. to 350 c.p.s. A dilution with ethyl alcohol to about 65 c.p.s. to 100 c.p.s. drops the resin solids content to 57% to 59%. This does not involve a large increase in the impregnant volume to secure the desired resin solids content of the finished sheet. Satisfactory operation may be obtained using either isopropanol or ethanol as a solvent for the resole. Dilution to low resin solids may be used to overcome an inherently high viscosity of a resin solvent. The viscosity need for proper penetration will vary with different solvents. Thus, a 100 c.p.s. viscosity is satisfactory with ethanol as a solvent whereas with isopropanol, a viscosity of 140 c.p.s. is satisfactory.

It may be seen from these considerations that the desirable viscosity of the impregnant and its solids content will depend to some extent on the particular means employed to impregnate the paper. Satisfactory impregnation of the paper may be obtained with the viscosity of the impregnant being between about 20 and 300 centipoises, the optimum viscosity being dependent on the solvents used and the manner of applying the impregnant to the paper.

After the paper has been impregnated, it is passed through an oven preferably maintained at about 140° F. to 150° F. for a time sufficient to evaporate most of the solvent. Subsequently, the paper is folded into bellows and formed into annular structures. Suitable end caps are then applied to the ends of the paper structures by means of a suitable adhesive and the assembly is then subjected to heat in the range of about 300° F. to about 350° F. to cure the impregnant of this invention and the adhesive. Curing temperatures of about 300° F. are adequate and are preferred to avoid the possibility of charring the paper.

The flexibility of the filter paper referred to above is typically measured by the ability of a cured specimen of paper to be wrapped around rods or mandrels of varying diameters without cracking the paper specimen. Thus, filter paper prepared in accordance with the process of this invention as described above in which the impregnant contains about 25 to 28 parts of Vinsol and about 1 to 6 parts of resorcinol per 100 parts of the resole solids and a paper prepared by the same process in which the resorcinol is omitted, were compared. It will be understood, of course, that the smaller the mandrel diameter about which the paper may be wrapped without cracking, the more flexible is the paper. The papers were compared by wrapping them about mandrels both longitudinally in the direction which the paper passed through the paper making machine and transversely thereto. The different results obtained with respect to the direction in which the paper is wrapped is due to the inherent greater flexibility of the paper in the machine direction.

In the following table, minimum mandrel diameters about which the paper can be wrapped without cracking for each direction are indicated.

| Impregnant Composition | Paper Machine Direction, in. | Paper Transverse Direction, in. |
|---|---|---|
| No resorcinol | 3/4 | 1/2 |
| 1 part resorcinol per 100 parts resole | 3/8 | 1/4 |
| 6.5 parts resorcinol per 100 parts resole | 3/8 | 1/4 |

It is to be noted that the minimum mandrel size about which the papers treated with the resorcinol-containing impregnant may be wrapped is one-half the minimum mandrel size about which paper treated with the same impregnant but containing no resorcinol may be wrapped, and this is very significant in the filter making art.

Although the invention has been described in terms of a specific embodiment, it is to be understood that variations may be employed and that the invention is not to be limited thereby except as by the following claims.

I claim:
1. In a process for making paper filter elements the steps comprising impregnating the paper with a liquid composition consisting essentially of about 100 parts by weight of a stage A phenol-formaldehyde resin, about 20 to 28 parts by weight of a petroleum hydrocarbon-insoluble thermoplastic lignin-type resin derived from pine wood and containing both methoxyl and hydroxyl groups, at least about 1 part by weight of resorcinol for providing said paper with flexibility but not more than the maximum amount which provides said paper with substantially equal flexibility and about 17 to 20 parts by weight of water, and heating the impregnated paper to evaporate the volatile constituents without effecting a significant cure of the impregnant.

2. In a process for making filter paper elements the steps comprising impregnating the paper with a resin mixture containing about 100 parts by weight of an alkaline catalyzed A stage resole, about 20 to 28 parts by weight of a petroleum hydrocarbon-insoluble thermoplastic lignin-type resin derived from pine wood and containing both methoxyl and hydroxyl groups, about 1 to 6.5 parts by weight of resorcinol and about 17 to 20 parts by weight of water, heating the impregnated paper to evaporate the volatile constituents without significantly curing the impregnant, and subsequently heating the dried paper to a temperature of about 300° F. to 350° F. whereby said thermoplastic resin, resorcinol and resole react to form a thermosetting resin providing the paper with improved flexibility and high resistance to tearing and collapse.

3. A resin-forming composition for use in making filter paper elements consisting essentially of about 100 parts by weight of a stage A phenol-formaldehyde resin, about 20 to 28 parts by weight of a petroleum hydrocarbon-insoluble thermoplastic lignin-type resin derived from pine wood and containing both methoxyl and hydroxyl groups, at least about 1 to about 6.5 parts by weight of resorcinol and about 17 to 20 parts by weight of water, said resole, resorcinol and pine wood resin being dissolved in sufficient solvent to form a composition with a viscosity of from about 20 to 300 centipoises at 77° F.

References Cited by the Examiner

UNITED STATES PATENTS

| | | | |
|---|---|---|---|
| 2,489,336 | 11/1949 | Spahr et al | 260—29.3 X |
| 2,513,274 | 7/1950 | Barkhuff | 260—33 |
| 2,540,352 | 2/1951 | Schenck | 117—155 |
| 2,565,152 | 8/1951 | Wachter et al. | 117—155 X |
| 2,591,466 | 4/1952 | Reynolds et al. | 117—155 X |
| 2,599,870 | 6/1952 | Sigtermans | 260—33.4 X |
| 2,639,242 | 5/1953 | Suen | 117—155 |
| 2,700,620 | 1/1955 | Somers | 117—68 |
| 2,875,899 | 3/1959 | Norton | 210—508 |
| 2,961,343 | 11/1960 | Atwell | 117—138.8 X |
| 3,090,700 | 5/1963 | Ball et al. | 117—155 X |
| 3,185,654 | 5/1965 | Ball et al. | 260—17.5 |
| 3,215,653 | 11/1965 | Hughes | 260—29.3 X |
| 3,226,251 | 12/1965 | Norton et al. | 117—155 |
| 3,227,667 | 1/1966 | Moffitt et al. | 260—17.5 |

WILLIAM D. MARTIN, *Primary Examiner.*

W. D. HERRICK, *Assistant Examiner.*